UNITED STATES PATENT OFFICE.

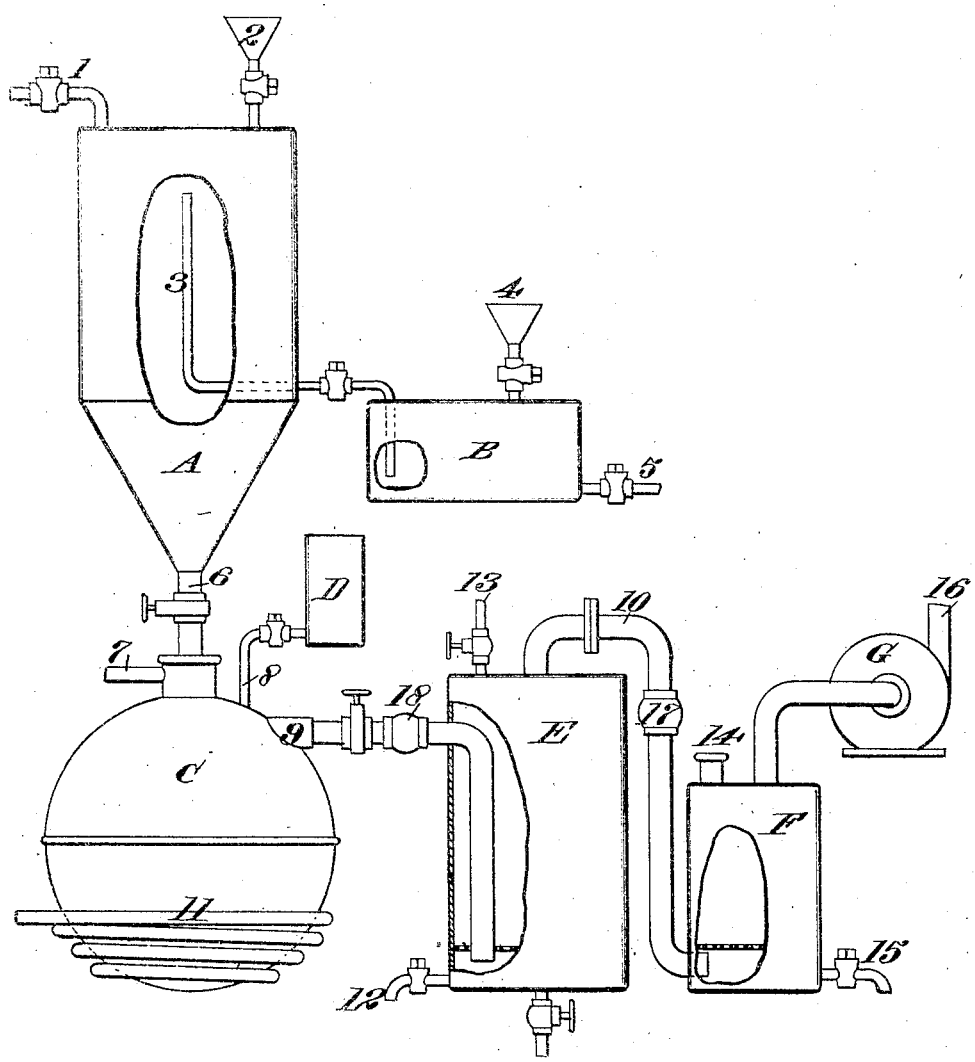

HARAI R. LAYNG, OF SENECA, CALIFORNIA.

PROCESS OF CYANIDING.

1,183,086.   Specification of Letters Patent.   Patented May 16, 1916.

Application filed December 29, 1914. Serial No. 879,448.

*To all whom it may concern:*

Be it known that I, HARAI R. LAYNG, a citizen of the United States, residing at Seneca, in the county of Plumas and State of California, have invented new and useful Improvements in Processes of Cyaniding, of which the following is a specification.

This process relates to the treatment of ores by cyanidation to recover precious metals and semi-precious metals such as copper and the like.

The chief objects of this process are to improve on present methods of cyanidation and to lessen the cost of cyanidation.

Other objects are to provide a cheap, simple and effective means to regenerate cyanid from solutions or other matter resulting from the treatment of ores by cyanidation; to provide a cheap, simple and effective means for precipitating values from solutions, and to render used or foul cyanid solutions more efficient for extraction purposes.

The drawing shows the arrangement of the devices in a simple manner for conducting the process on an intermittent scale in which—

A is a suitable sealed device in which the solutions are treated; 1 an inlet for solution; 2 an inlet for acid and chemicals; 3 a decanting pipe for discharging clear solution; B a neutralizing tank; 4 an inlet for alkalis; 5 an outlet for treated solution; 6 a discharge for precipitate; 7 a feed port and inlet for air; 8 an inlet for chemicals; C a retort; D stock vats for chemicals; 9 an outlet from the retort; E a nitric absorption device; 10 a conduit; F a cyanid absorption device; G a pump; 11 heating coils; 12 an outlet for nitric acid; 13 an inlet for water; 14 an inlet for chemicals; 15 an outlet for cyanid; 16 a discharge from the pump; and 17 and 18 check valves.

I have found in treating many ores by cyanidation that much cyanid is consumed through the formation of complex cyanogen compounds such as sulfocyanids and double salts thereof with the metal cyanids; silver, copper and other metals entering the solution as a sulfocyanid dissolved in cyanid, as expressed by the following equations:

$$2AgS + 4KCN + H_2O + O =$$
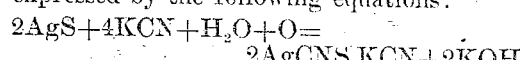
$$2CuS + 8KCN + 2H_2O =$$
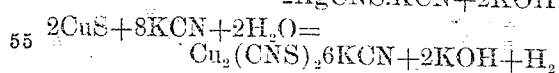

The above equations show that one-half of the cyanid consumed by silver is consumed through the formation of sulfocyanid. Compounds like $Cu_2(CNS)_2$ when contained in a cyanid solution seriously reduce the solvent efficiency of cyanid solutions and for that reason they are the cause of low extractions of gold and silver from ores by cyanidation. Relatively large amounts of free sulfocyanid, such as KCNS, also have a tendency to reduce the extractive efficiency of cyanid.

The methods of precipitation in common use, namely zinc or aluminum methods, do not completely precipitate such compounds as $Cu_2CNS_2$ from cyanid solutions and they cause free sulfocyanid to be formed, as may be shown by the following equation:

$$AgCNS.KCN + 3KCN + Zn + H_2O =$$
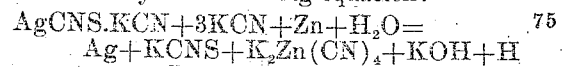

In describing this process I wish it understood that I do not limit the process to precipitation as other precipitation processes may be used in conjunction with it; that the process may be used in conjunction with any other cyanid processes; and that the process is of such a nature as will allow it to be modified and used in many forms without its being otherwise changed in nature or purpose.

In conducting the process the solution resulting from the treatment of the ore is treated in a sealed device A, or any other suitable device, which will prevent the escape of HCN, with any suitable chemical, such as acids, which will cause the sulfocyanid compounds to be precipitated from the solution. For example:—

$$Cu_2CNS_2.6KCN + 3H_2SO_4 =$$
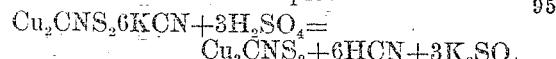
$$2Ag(CNS.KCN + H_2SO_4) =$$
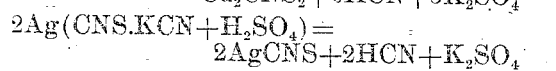

It may be herein mentioned that in cases wherein the silver is not all in solution as a sulfocyanid but as a simple cyanid dissolved in cyanid, and wherein the solution contains free sulfocyanid, the acidification of such a solution will cause the transposition of the silver cyanid to silver sulfocyanid. For example:—

$$KAg(CN)_2 + KCNS + H_2SO_4 =$$

In case the solution contains free sulfocyanid this may be separated from the solution, if desired, by precipitation as an insoluble compound by means of reducing agents, such as, for example, cuprous chlorid. In case the solutions do not contain free sulfocyanid and contain potassium silver cyanid, some free sulfocyanid may be added to the solution to cause the silver to precipitate as a sulfocyanid compound when acid is added for the purpose of liberating the cyanogen which would otherwise have been contained in the silver cyanid. Heat may be applied in the above steps of the process to facilitate the precipitation and aid in the separation. The precipitate so formed is separated from the solution by settling or filtering, or a combination of both procedures, and is treated in a suitable retort C with an oxidizing agent, such as $HNO_3$, $NaNO_3$ or the like, preferably in the presence of sulfuric or other suitable acid, with the aid of heat. This treatment causes the sulfur of the CNS to be oxidized to sulfate and the cyanogen to combine with hydrogen to form hydrocyanic acid according to the following equations:

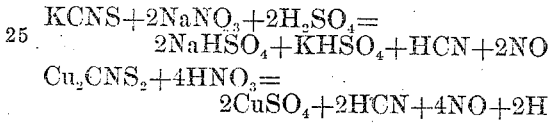

$KCNS + 2NaNO_3 + 2H_2SO_4 =$
$\quad 2NaHSO_4 + KHSO_4 + HCN + 2NO$
$Cu_2CNS_2 + 4HNO_3 =$
$\quad 2CuSO_4 + 2HCN + 4NO + 2H$ While the above reactions are occurring in the retort C air is admitted either to the retort or at some other convenient place to supply the oxygen necessary to oxidize the nitrogen gases to nitric acid or for other purposes, such as to facilitate the conveyance of the gases. The gases from the retort are conveyed to any suitable absorption device E containing water, wherein the reactions between the oxygen of the air and the nitrogen gases are completed and wherein the nitric acid is retained and from which it may be drawn for use as desired. The gases containing the HCN are then conveyed to any suitable absorption device F containing any suitable absorption material, for example CaO or NaOH which will combine with the hydrocyanic acid to form cyanid which will remain in the device and which can be drawn from the device and used as desired.

The residue in the retort, after the removal of as much of the HCN or nitrate by heat or mechanical means as will prove profitable, may be treated as desired to recover the values. This residue usually contains copper sulfate which may be separated from the other compounds by any suitable means and used in the presence of a reducing agent, such as $SO_2$, to precipitate free sulfocyanid from the acidified cyanid solution of the first step of this process, or it may be treated with salt and a reducing agent so as to form cuprous chlorid which may also be used for precipitating free sulfocyanid and the like from the acidified cyanid solution.

I wish it understood that other chemicals, such as HCl or $Na_2S$ may be used in conjunction with the nitrate in cases wherein some simple cyanids like AgCN are contained in the precipitate produced in the first step of this process for the purpose of rendering the regeneration of cyanid from such simple cyanids more efficient. I further wish it understood that the process may be conducted either wholly or in part as either an intermittent or a continuous process or a combination of both.

The strength of the acid and nitrate used in the treatment of the precipitate varies according to the nature of the precipitate; so also does the manner of applying them as well as does the heat. Thus silver sulfocyanid will give good yields of cyanid with fairly strong acids, while cuprous sulfocyanid requires weaker acids in order to obtain a good yield. The strength of the acid and the temperature of the charge, together with the manner of procedure which will have to be allowed on precipitates from different solutions, will vary with the nature of the solution and can be determined by simple laboratory tests or experiments upon the particular precipitate.

The acidified cyanid solution from which the precipitate has been removed may be treated in a sealed device B with an alkali to regenerate cyanid from its contained hydrocyanic acid which was liberated by the first steps of this process and then used as desired, or it may be otherwise treated as desired.

It has been shown by the foregoing that the chemical treatment of the solution causes the double cyanogen compounds to break up, forming a gaseous cyanogen compound, viz. HCN, and an insoluble cyanogen compound which, when treated with suitable chemicals in a suitable device, resolves in the formation of available cyanid and that the chemical used in treating the insoluble cyanogen compound is also regenerated to an available form. Thus it is evident that the process is economical.

Numerous tests with this process have shown that a regeneration of over 80% of the cyanid consumed in forming sulfocyanid at a cost not exceeding 4¢ per pound of cyanid in terms of KCN regenerated can be obtained; also that about 85% of the nitrate used to regenerate cyanid from sulfocyanid is regenerated and recovered in an available form. The tests also show that all of the cyanid used in holding the insoluble cyanogen compounds, like $Cu_2(CNS)_2$, in solution is regenerated at a good profit. They also show that all of the metals, like copper, are precipitated and that the solution after having been treated by this process have much more extraction efficiency than they had before treatment.

An example of the application of the process is as follows: Solution known as circulating solution from a silver mill in Nevada partially analyzing as follows: 5.5# KCN 1.3# P. A. 6.35# T. A. 1.71# KCNS 1.21# KCNS combined .86# Cu 2.14 oz. Ag was treated with $H_2SO_4$ at 11.3# per ton and $Cu_2Cl_2$ at 2.08# per ton in a sealed device. The precipitate was separated by filtering and the filtrate was made alkaline with CaO added at 5# per ton. This treatment of the solution resulted in a regeneration of 2.1# KCN per ton of solution. The precipitate was placed in a retort which was connected with a nitric acid absorption device and a cyanid absorption device thence to a vacuum pump. To the precipitate in the retort which weighed dry at 3.902# per ton of solution, water at 47# and $H_2SO_4$ at 3# per ton of solution were added, and heat in the form of a water bath was applied, and air was drawn through the devices. Nitric acid was allowed to feed slowly into the charge. After a few minutes when about 1.2# $HNO_3$ per ton of solution had been added action started. $HNO_3$ was continually added for about twenty-five minutes. When 5.76# per ton of solution had been added and practically all of the precipitate had been decomposed, the addition of the $HNO_3$ was then ceased, the heat was increased and the contents of the retort were allowed to distil under a reduced pressure until fumes of $SO_3$ began to show in the retort. The retort was allowed to cool and its contents discharged into water containing a trace of sodium sulfid to precipitate traces of silver, etc. The crystals of copper sulfate were dissolved in the water and the $CuSO_4$ solution so formed was separated from the insoluble, which consisted mainly of silver chlorid with a little calcium sulfate. After the above procedure it was found that the water and washings from the nitric acid absorption device contained nitric acid of 4.89# per ton of solution and that the cyanid absorption device contained cyanid at 1.565# KCN per ton of solution. Some $H_2SO_4$ was recovered in the nitric device. In this test the mixture in the retort was a little too strong in $HNO_3$ for a few minutes directly after the commencement of action. This caused the regeneration of cyanid to be somewhat low. The small nitric acid device used caused a somewhat low recovery of nitric acid. The cyanid recovered in the cyanid recovery device could, of course, be added to the solution from which the precipitate had been removed.

Having thus described my invention, what I claim and desire to secure by Letters Patent is—

1. A process for regenerating cyanid and recovering values from a cyanid solution containing compounds of valuable metals which comprises treating the solution with suitable chemicals to precipitate cyanogen compounds of the metals, separating the precipitate so formed from the solution, and treating the precipitate with a mixture comprising an oxidizing agent and capable of converting cyanid into hydrocyanic acid, substantially as described.

2. A process for regenerating cyanid and recovering values from a cyanid solution containing compounds of valuable metals which comprises treating the solution with suitable chemicals to generate hydro-cyanic acid and to precipitate cyanogen compounds of the metals, separating the precipitate from the solution, converting the hydrocyanic acid in the solution into an available cyanid, and treating the precipitate with a mixture comprising an oxidizing agent and capable of converting cyanid into hydrocyanic acid, substantially as described.

3. A process for regenerating cyanid and recovering values from a cyanid solution containing compounds of valuable metals which comprises treating the solution with suitable chemicals to precipitate cyanogen compounds of the metals, separating the precipitate so formed from the solution, and heating the precipitate in the presence of an acid with an oxidizing agent to regenerate cyanid and form simple salts of the metals, substantially as described.

4. A process for regenerating cyanid and recovering values from a cyanid solution containing compounds of valuable metals which comprises treating the solution with suitable chemicals to generate hydrocyanic acid and to precipitate cyanogen compounds of the metals, separating the precipitate from the solution, converting the hydrocyanic acid in the solution into an available cyanid and heating the precipitate in the presence of an acid with an oxidizing agent to regenerate cyanid and form salts of the metals, substantially as described.

5. A process of regenerating cyanid from mixtures containing complex cyanogen compounds of metals and obtained in the cyanid treatment of ores which comprises treating such mixtures with a mixture comprising an oxidizing agent and capable of converting any metal cyanids present into other salts of these metals, substantially as described.

6. A process of regenerating cyanid from mixtures containing cyanids of precious metals and sulfocyanids which comprises heating such mixtures in the presence of an acid with an oxidizing agent, substantially as described.

7. A process of regenerating cyanid from mixtures containing cyanids of precious metals and sulfocyanids which comprises heating such mixtures in the presence of a mineral acid with a nitrate, substantially as described.

8. A process for regenerating cyanid and recovering values from a cyanid solution containing compounds of valuable metals which comprises treating the solution with suitable chemicals to precipitate cyanogen compounds of the metals, separating the precipitate, treating the precipitate with suitable chemicals to convert the combined cyanogen to a gaseous mixture containing hydrocyanic acid, treating the gaseous mixture by any suitable means to recover the chemicals, and treating the resulting gases by any suitable means to regenerate cyanid, substantially as described.

9. A process for regenerating cyanid from a cyanid solution containing compounds of valuable metals which comprises treating the solution with an acid to a precipitate cyanogen compounds of the metals and form a solution containing hydrocyanic acid, separating the precipitate and treating it with a mixture comprising an oxidizing agent and capable of converting cyanid into hydrocyanic acid to decompose any metal cyanid and sulfocyanid present into a different metal compound and a gaseous mixture containing hydrocyanic acid, and treating said gaseous mixture and said solution containing hydrocyanic acid to regenerate available cyanid, substantially as described.

In testimony whereof I have hereunto set my hand in the presence of two subscribing witnesses.

HARAI R. LAYNG.

Witnesses:
JOHN H. HERRING,
FRANCES V. COLE.